(12) United States Patent
Valera

(10) Patent No.: US 12,216,283 B2
(45) Date of Patent: *Feb. 4, 2025

(54) OPTICAL STRUCTURE FOR AUGMENTED REALITY DISPLAY

(71) Applicant: Snap Inc., Santa Monica, CA (US)

(72) Inventor: Mohmed Salim Valera, Sutton Coldfield (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,696

(22) Filed: Jun. 29, 2023

(65) Prior Publication Data

US 2023/0341696 A1 Oct. 26, 2023

Related U.S. Application Data

(63) Continuation of application No. 17/053,725, filed as application No. PCT/GB2019/050958 on Apr. 3, 2019, now Pat. No. 11,782,275.

(30) Foreign Application Priority Data

May 17, 2018 (GB) ..................................... 1808055

(51) Int. Cl.
*G02B 27/01* (2006.01)
*F21V 8/00* (2006.01)
(Continued)

(52) U.S. Cl.
CPC ........... *G02B 27/0172* (2013.01); *G02B 5/18* (2013.01); *G02B 6/0023* (2013.01); *G02B 6/005* (2013.01);
(Continued)

(58) Field of Classification Search
CPC .... G02B 27/0172; G02B 5/18; G02B 6/0023; G02B 6/005; G02B 6/0076;
(Continued)

(56) References Cited

U.S. PATENT DOCUMENTS 11,454,809 B2 9/2022 Lee et al.
11,782,275 B2 * 10/2023 Valera ................ G02B 27/0172
359/630

(Continued)

FOREIGN PATENT DOCUMENTS

CN 107797287 A 3/2018
CN 210243962 4/2020
(Continued)

OTHER PUBLICATIONS

"U.S. Appl. No. 17/053,725, Notice of Allowance mailed Jun. 5, 2023", 11 pgs.
(Continued)

*Primary Examiner* — Collin X Beatty
(74) *Attorney, Agent, or Firm* — Schwegman Lundberg & Woessner, P.A.

(57) ABSTRACT

An augmented reality display is disclosed. A colour projector 2 emits an image in a narrow beam comprising three primary colours: red, green and blue. A pair of waveguides 4, 6 is provided in the path of the projected beam. A first input grating 8 receives light from the projector 2 and diffracts the received light so that diffracted wavelengths of the light in first and second primary colours are coupled into the first waveguide 6, and so that diffracted wavelengths of the light in second and third primary colours are coupled out of the first waveguide in a direction towards the second waveguide 4. A second input diffraction grating 10 receives
(Continued)

light coupled out of the first waveguide 6 and diffracts the second and third primary colours so that they are coupled into the second waveguide 4.

20 Claims, 3 Drawing Sheets

(51) Int. Cl.
*G02B 5/18* (2006.01)
*G02B 27/42* (2006.01)

(52) U.S. Cl.
CPC ....... *G02B 6/0076* (2013.01); *G02B 27/4205* (2013.01); *G02B 2005/1804* (2013.01); *G02B 2027/0112* (2013.01)

(58) Field of Classification Search
CPC ........ G02B 27/4205; G02B 2005/1804; G02B 2027/0112; G02B 27/0101; G02B 27/0081; G02B 27/1086
See application file for complete search history.

(56) References Cited

U.S. PATENT DOCUMENTS

| 2006/0221448 | A1 | 10/2006 | Nivon et al. |
| 2014/0140653 | A1 | 5/2014 | Brown et al. |
| 2020/0117003 | A1* | 4/2020 | Pfeiffer ............... G02B 6/4214 |
| 2021/0239982 | A1 | 8/2021 | Valera |

FOREIGN PATENT DOCUMENTS

| EP | 3794400 | 3/2021 |
| FI | 3794400 | 6/2022 |
| GB | 2556938 A | 6/2018 |
| GB | 2573793 | 11/2019 |
| HK | 40046042 | 10/2021 |
| JP | 2009186794 A | 8/2009 |
| TW | 201947263 | 12/2019 |
| TW | 1791822 | 2/2023 |
| WO | WO-2011131978 A1 | 10/2011 |
| WO | WO-2014210349 A1 | 12/2014 |
| WO | WO-2016020643 A1 | 2/2016 |
| WO | WO-2018096359 A2 | 5/2018 |
| WO | WO-2019220072 A1 | 11/2019 |

OTHER PUBLICATIONS

"U.S. Appl. No. 17/053,725, Preliminary Amendment filed Nov. 6, 2020", 6 pgs.
"International Application Serial No. PCT/GB2019/050958, International Preliminary Report on Patentability mailed Apr. 22, 2020", 5 pgs.
"International Application Serial No. PCT/GB2019/050958, International Search Report mailed Jul. 1, 2019", 3 pgs.
"International Application Serial No. PCT/GB2019/050958, Written Opinion mailed Jul. 1, 2019", 5 pgs.
"Taiwanese Application Serial No. 11120847210, Office Action mailed Aug. 29, 2022", w/ English Machine Translation, 12 pgs.
"International Application Serial No. PCT/GB2019/050958, Response to Written Opinion and Article 34 Amendments filed Mar. 12, 2020", 5 pgs.
"U.S. Appl. No. 17/053,725, Corrected Notice of Allowability mailed Sep. 12, 2023", 2 pgs.
Elfstrom, Henna, et al., "Fabrication of blazed gratings by area-coded effective medium structures", Optics Communications 266, Elsevier, (2006), 697-703.
"European Application Serial No. 19717558.1, Response to Communication pursuant to Rules 161(1) and 162 EPC filed Jun. 7, 2021", 20 pgs.
"United Kingdom Application Serial No. 1808055.6, Search Report mailed Nov. 20, 2018", 3 pgs.

* cited by examiner

OPTICAL STRUCTURE FOR AUGMENTED REALITY DISPLAY

CROSS-REFERENCE TO RELATED APPLICATION

This application is a continuation of U.S. patent application Ser. No. 17/053,725, filed Nov. 6, 2020, which application is a U.S. National Stage Filing under 35 U.S.C. 371 from International Application No. PCT/GB2019/050958, filed Apr. 3, 2019, which claims priority from United Kingdom Application No. 180855.6, filed May 17, 2018, each of which are incorporated herein by reference in its entirety.

The present invention relates to an optical structure for use in a full-colour augmented reality or virtual reality display such as a headset or a head-up display. In particular, the invention relates to a pair of waveguides having diffractive optical elements that cause three primary colours from a projector to be split between the two waveguides.

An augmented reality display allows a user to view their surroundings as well as projected images. In military or transportation applications the projected images can be overlaid on the real world perceived by the user. Other applications for these displays include video games and wearable devices, such as glasses. By contrast, in a virtual reality display a user can only perceive projected images and light from their real world surroundings is obscured.

In a normal augmented reality set-up a transparent display screen is provided in front of a user so that they can continue to see the physical world. The display screen is typically a glass waveguide, and a projector is provided to one side. Light from the projector is coupled into the waveguide by a diffraction grating (an input grating). The projected light is totally internally reflected within the waveguide. The light is then coupled out of the waveguide by another diffraction grating (an output grating) so that it can be viewed by a user. The projector can provide information and/or images that augment a user's view of the physical world.

One challenge in the field of augmented reality displays is to provide full colour images. To date this has proven to be difficult without introducing undesirable optical effects. In one approach coloured light is split into three primary components: red, green and blue. Each primary component is then coupled towards a viewer separately via a dedicated waveguide. This requires a stack of three waveguides which may be undesirably bulky for some applications.

WO 2011/131978 describes an optical element that attempts to provide full colour images using only two waveguides. According to this technique three primary colour components are split between two waveguides and are re-combined in light provided towards a viewer in order to provide full colour viewing. This technique requires the use of diffraction gratings having small periods which can be difficult to manufacture.

An object of the present invention is to provide an alternative technique for providing full colour images using only two waveguides that can be achieved using simpler manufacturing principles.

According to an aspect of the present invention there is provided an optical structure for use in an augmented reality display, the optical structure comprising a first waveguide and a second waveguide, wherein the first waveguide comprises: a first input diffractive optical element configured to receive light from a projector and diffract the received light so that diffracted wavelengths of the light in first and second primary colours are coupled into the first waveguide, to be totally internally reflected within the first waveguide, and so that diffracted wavelengths of the light in second and third primary colours are coupled out of the first waveguide in a direction towards the second waveguide; and a first output diffractive optical element configured to receive and diffract totally internally reflected light within the first waveguide in order to couple the totally internally reflected light out of the first waveguide towards a viewer; wherein the second waveguide comprises: a second input diffractive optical element configured to receive diffracted light that is coupled out of the first waveguide by the first input diffractive optical element, and to diffract the received light so that diffracted wavelengths of the light in the second and third primary colours are coupled into the second waveguide, to be totally internally reflected within the second waveguide; and a second output diffractive optical element configured to receive and diffract totally internally reflected light within the second waveguide in order to couple the totally internally reflected light out of the second waveguide towards the viewer.

In this arrangement the first and second input diffractive optical elements are laterally offset from one another, with respect to an input direction in which light is coupled towards the first waveguide by a projector. In this way, light can be projected onto the first input diffractive optical element without first interacting with the second input diffractive optical structure.

This provides a technique for coupling three primary colours into two stacked waveguides. Unusually the present technique couples light into the second waveguide which has already been diffracted by the input diffractive optical element on the first waveguide. This can advantageously reduce the complexity of manufacture for the second input diffractive optical element.

Preferably the first input diffractive optical element is a reflection diffraction grating. The first input diffractive optical element could alternatively be provided as a transmission diffraction grating. However, the reflective arrangement may be preferred since it can be arranged with a higher efficiency. The second input diffractive optical element may be a transmission diffraction grating.

Preferably the diffractive optical elements have a period which is defined by the separation of diffractive optical features. The inverse of the period of the second output diffractive optical element is preferably equal to the inverse of the period of the first input diffractive optical element plus the inverse of the period of the second input diffractive optical element. In other words, the grating vectors of the first and second input diffractive optical elements sum to yield the grating vector of the second output diffractive optical element. Preferably the grating vector of the first output diffractive optical element is equal to the grating vector of the first input diffractive optical element. In this way, light that is output from the first and second output diffractive optical elements towards a viewer is in conjugation with the light that is input to the optical structure from a projector. This ensures that full colour light can be provided without introducing undesirable optical effects.

In one embodiment the period of the first input grating may be around 440 nm and the period of the second output grating may be around 335 nm. This means that the period of the second input grating should be around 1400 nm, which is considerably easier to manufacture than gratings with smaller periods.

Preferably the first, second and third primary colours are red, green and blue respectively. In other embodiments it may be possible to use different primary colours such as yellow, cyan and magenta.

According to another aspect of the invention there is provided an augmented reality display comprising: the optical structure as previously defined; and a projector configured to direct light with first, second and third primary colours towards the first input diffractive optical element.

Embodiments of the invention are now described, by way of example, with reference to the drawings, in which.

Figure 1:
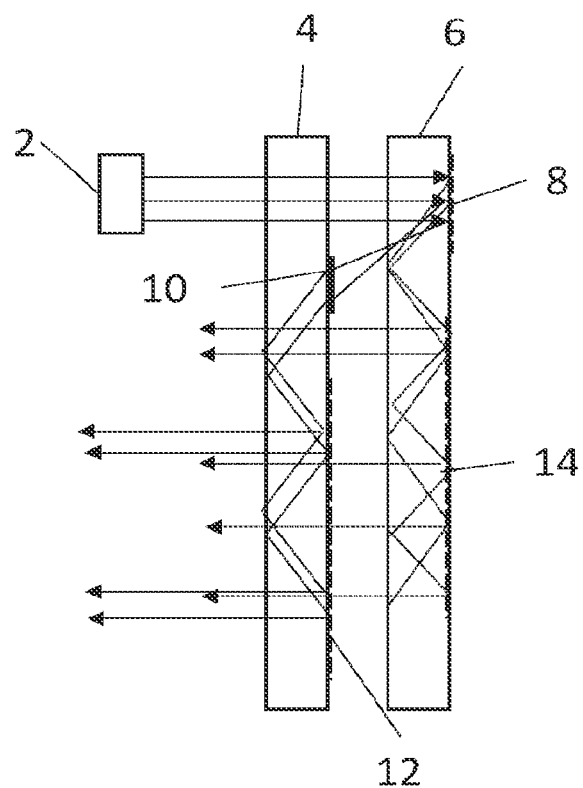
FIG. 1 is a side view of an augmented reality display in an embodiment of the invention.

FIG. 1 is a side view of an augmented reality display. A colour projector 2 is provided which emits an image in a narrow beam comprising three primary colours: red, green and blue. A pair of waveguides 4, 6 is provided in the path of the projected beam. The waveguides 4, 6 are optically transparent and, in this embodiment, made of glass having a refractive index, n, of around 1.7. The waveguides 4, 6 have first and second major surfaces that are parallel to one another and which extend out of the plane of the page as viewed in FIG. 1. For the sake of simplicity the waveguides are referred to as the "blue" waveguide 4 and the "red" waveguide 6. This does not refer to the colour of the waveguides themselves, since they are optically transparent. Rather, it refers to the predominant colour of the light that the respective waveguides are configured to carry.

The ray along the optical axis of projector 2 is transmitted directly through the transparent blue waveguide 4 and through a first surface of the red waveguide 6 at an angle that is parallel to the surface normal of the blue waveguide 4. On the rear surface of the red waveguide 6 from the perspective of the projector 2 is positioned a reflective input diffraction grating 8 having a period of 440 nm where the period is defined as the distance between respective grating grooves. The reflective input diffraction grating 8 is configured to diffract the light that is incident upon it. The angle of diffraction is, of course, wavelength dependent, according to the grating equation.

Therefore a spectrum of colours is provided in an angular spread emanating away from the reflective input diffraction grating 8.

The period of the reflective input diffraction grating 8 is chosen so that, following diffraction, red wavelengths are totally internally reflected within the red waveguide 6. A proportion of green wavelengths are also totally internally reflected within the red waveguide 6. However, blue wavelengths are diffracted at an angle that is lower than the critical angle for total internal reflection. Therefore, blue wavelengths of light, and some green wavelengths, escape total internal reflection within the red waveguide 6 and are instead refracted. The refracted wavelengths of light propagate into an air gap between the red waveguide 6 and the blue waveguide 4 and are received at a second input diffraction grating 10 on a surface of the blue waveguide 4.

The second input diffraction grating 10 is provided with a period of around 1404 nm. The second input diffraction grating 10 is configured to diffract the received light so that the received red and green wavelengths are coupled into the blue waveguide 4 at an angle that is higher than the critical angle for total internal reflection. Therefore, the blue and green wavelengths are diffracted twice: first by the first input diffraction grating 8 and then by the second input diffraction grating 10 so that they are totally internally reflected within the blue waveguide 4. Rays received at the second input diffraction grating 10 are already angled, and this allows the 1404 nm period grating to be optimised using a square wave type of structure rather than a sloped structure. In addition, because the period of the second input diffraction grating 10 is a multiple of blue and green wavelengths it is possible to use techniques such as 'area coded' gratings, as described for example in Optics Communications, volume 266 (2006), pp 697-703.

Light that is totally internally reflected within the red waveguide 6 extends towards a first output diffractive optical element 14. The first output diffractive optical element 14 is provided with relatively low efficiency in order to act as an expansion grating and provide expansion of the beam in at least one dimension, and preferably two dimensions. The second output diffractive optical element 12 is similar to the first output diffractive optical element 14, but is provided with a different period. In this example the first output diffractive optical element 14 has a period of around 440 nm and the second output diffractive optical element 12 has a period of around 335 nm.

Figure 2:
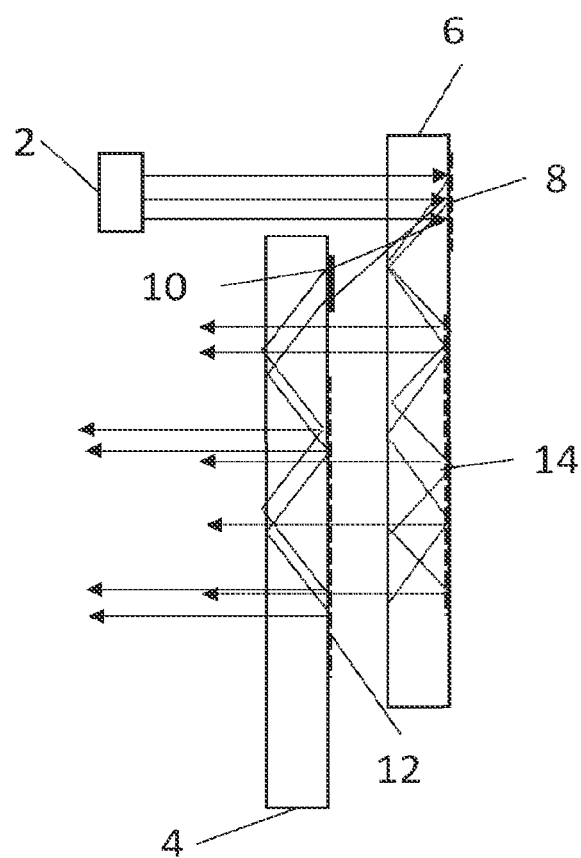
FIG. 2 is a side view of an augmented reality display in another embodiment of the invention.

The first and second input diffraction gratings 8, 10 are offset from one another with respect to the direction in which light is output by the projector 2. In an alternative embodiment, as shown in FIG. 2, the blue waveguide 4 is provided at a lower position so that light from the projector 2 is received directly at the red waveguide 6 without first being transmitted through the blue waveguide 4.

The first and second output diffractive optical elements 12, 14 in this embodiment are expanding diffractive optical exit pupils, as described in WO 2016/020643. The first and second output elements 12, 14 therefore comprise a pair of crossed linear gratings, or a photonic crystal structure. In both cases, the output elements 12, 14 each comprise two diffractive optical elements overlaid on one another in or on the waveguide 2. Each diffractive optical element within the respective output elements 12, 14 can then couple the received light towards the other diffractive optical element in the pair which can then act as an output diffractive optical element which couples light out of the red of blue waveguide 4, 6 towards a viewer. The grating period for the overlaid diffractive optical elements is 440 nm for the first output diffractive optical element 14 in the red waveguide 6 and 335 nm for the second output diffractive optical element 12 in the blue waveguide 4.

In an alternative configuration the first and second output diffractive optical elements 12, 14 can be simple linear diffraction gratings in order to provide a one-dimensional expansion of the totally internally reflected light within the red and blue waveguides 4, 6.

It is important that undesirable optical effects are avoided in the present arrangement and that the colour image emitted by the projector 2 is provided in the output to the viewer. In part, this is achieved by careful selection of grating periods for the first and second input diffraction gratings 8, 10 and the first and second output diffractive optical elements 12, 14. In particular it has been found that it is important to maintain conjugation in the beams. This is achieved in the red waveguide 6 because the period of the first input diffraction grating 8 is the same as the period of the first output diffractive optical element 14. Additional considerations are required for the blue waveguide 4 because light has already been diffracted once when it is received at the second input diffraction grating 10. A grating vector can be defined for each grating having a magnitude that is equal to the inverse of the grating period. For the blue waveguide 4, the magnitude of the grating vector of the first input diffraction grating 8 plus the grating vector of the second input diffraction grating 10 should be equal to the magnitude of the grating vector of the second output diffractive optical element 12.

Figure 3:
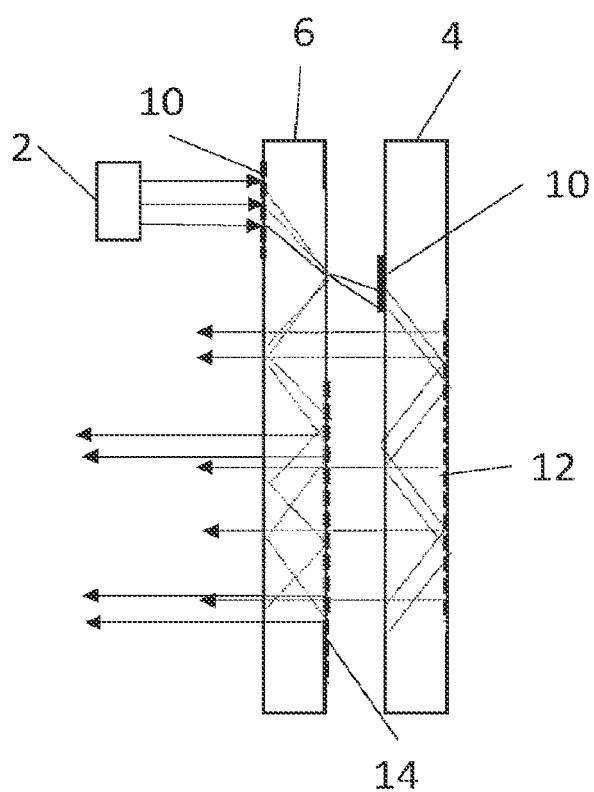
FIG. 3 is a side view of an augmented reality display in another embodiment of the invention.

FIG. 3 is a side view of an augmented reality display in another embodiment of the invention. In this embodiment the positions of the blue and red waveguides 4, 6 are interposed in comparison with the embodiments of FIGS. 1 and 2. Light from the projector 2 is initially incident on the red waveguide 6 and, in this embodiment, the first input diffraction grating 8 is provided as a transmission grating. Light is diffracted by the first input diffraction grating 8 so that red wavelengths of light, and some green wavelengths, are coupled into the red waveguide 6 to be totally internally reflected within the red waveguide 6. Blue wavelengths of light, and some green wavelengths, are diffracted by the first input diffraction grating 8 at angles that are below the critical angle for total internal reflection. Therefore, these wavelengths escape total internal reflection and are refracted into an air gap towards the blue waveguide 4. In this example embodiment the second input diffraction grating 10 on the blue waveguide 4 is provided as a transmission grating on the front surface of the blue waveguide 4, from the perspective of the projector 2. The second input diffraction grating 10 is configured to diffract the blue and green wavelengths at angles that are above the critical angle for total internal reflection within the blue waveguide 4. Thus, the blue (and some green) wavelengths are coupled into the blue waveguide 4 to be totally internally reflected within the blue waveguide 4.

The red waveguide 6 includes a first output diffractive optical structure 14 and the blue waveguide 4 includes a second output diffractive optical structure 12, and these have similar properties to those described in relation to previous embodiments.

The invention claimed is:

1. An optical structure for use in an augmented reality display, the optical structure comprising a first waveguide and a second waveguide, wherein:
the first waveguide comprises:
a first input diffractive optical element configured to receive light and diffract the received light so that diffracted wavelengths of the light in a first one or more colours are coupled into the first waveguide, to be totally internally reflected within the first waveguide, and so that diffracted wavelengths of the light in a second one or more colours are coupled out of the first waveguide in a direction towards the second waveguide; and
a first output diffractive optical element configured to receive and diffract totally internally reflected light within the first waveguide in order to couple the totally internally reflected light out of the first waveguide towards a viewer;
the second waveguide comprises:
a second input diffractive optical element configured to receive diffracted light that is coupled out of the first waveguide by the first input diffractive optical element, and to diffract the received light so that diffracted wavelengths of the light in the second one or more colours are coupled into the second waveguide, to be totally internally reflected within the second waveguide; and
a second output diffractive optical element configured to receive and diffract totally internally reflected light within the second waveguide in order to couple the totally internally reflected light out of the second waveguide towards the viewer; and the diffractive optical elements have a period which is a separation of diffractive optical features, and wherein an inverse of the period of the second output diffractive optical element is equal to the inverse of the period of the first input diffractive optical element plus the inverse of the period of the second input diffractive optical element.

2. The optical structure of claim 1, wherein the first input diffractive optical element is a reflection diffraction grating.

3. The optical structure of claim 1, wherein the second input diffractive optical element is a transmission diffraction grating.

4. The optical structure of claim 1, wherein:
the first one or more colours includes at least one shared colour that is also included in the second one or more colours, such that only a portion of the wavelengths of the light in the shared colour is coupled out of the first waveguide towards the second waveguide.

5. The optical structure of claim 4, wherein:
the first one or more colours are red and green; and
the second one or more colours are green and blue.

6. The optical structure of claim 1, wherein:
the first one or more colours and the second one or more colours are primary colours.

7. An augmented reality display comprising:
the optical structure of claim 1; and
a projector configured to direct light with the first one or more colours and the second one or more colours towards the first input diffractive optical element.

8. The augmented reality display of claim 7, wherein the first input diffractive optical element is a reflection diffraction grating.

9. The augmented reality display of claim 7, wherein the second input diffractive optical element is a transmission diffraction grating.

10. The optical structure of claim 2, wherein the second input diffractive optical element is a transmission diffraction grating.

11. The optical structure of claim 2, wherein:
the first one or more colours are red and green; and
the second one or more colours are green and blue.

12. The optical structure of claim 3, wherein:
the first one or more colours are red and green; and
the second one or more colours are green and blue.

13. A method, comprising:
receiving light at a first input diffractive optical element of a first waveguide;
diffracting the received light, by the first input diffractive optical element, so that diffracted wavelengths of the light in a first one or more colours are coupled into the first waveguide;
totally internally reflecting the diffracted wavelengths of the light in the first one or more colours within the first waveguide, so that diffracted wavelengths of the light in a second one or more colours are coupled out of the first waveguide in a direction towards a second waveguide;
receiving and diffracting, by a first output diffractive optical element of the first waveguide, the totally internally reflected light within the first waveguide in order to couple the totally internally reflected light out of the first waveguide towards a viewer;
receiving, at a second input diffractive optical element of the second waveguide, diffracted light that is coupled out of the first waveguide by the first input diffractive optical element;

diffracting, by the second input diffractive optical element, the received light so that diffracted wavelengths of the light in a second one or more colours are coupled into the second waveguide;

totally internally reflecting the diffracted wavelengths of the light in the second one or more colours within the second waveguide; and receiving and diffracting, by a second output diffractive optical element of the second waveguide, the totally internally reflected light within the second waveguide in order to couple the totally internally reflected light out of the second waveguide towards a viewer;

wherein the diffractive optical elements have a period which is a separation of diffractive optical features, and wherein the inverse of the period of the second output diffractive optical element is equal to an inverse of the period of the first input diffractive optical element plus the inverse of the period of the second input diffractive optical element.

14. The method of claim 13, wherein the first input diffractive optical element is a reflection diffraction grating.

15. The method of claim 13, wherein the second input diffractive optical element is a transmission diffraction grating.

16. The method of claim 13, wherein:
the first one or more colours includes at least one shared colour that is also included in the second one or more colours, such that only a portion of the wavelengths of the light in the at least one shared colour is coupled out of the first waveguide towards the second waveguide.

17. The method of claim 16, wherein:
the first one or more colours are red and green; and
the second one or more colours are green and blue.

18. The method of claim 13, wherein:
the first one or more colours and the second one or more colours are primary colours.

19. The method of claim 13, further comprising:
directing light with the first one or more colours and the second one or more colours from a projector towards the first input diffractive optical element.

20. The method of claim 13, wherein the first waveguide and the second waveguide are components of a single optical structure.

* * * * *